(12) United States Patent
Cho et al.

(10) Patent No.: US 8,203,137 B2
(45) Date of Patent: Jun. 19, 2012

(54) PHOTONIC STRUCTURE

(75) Inventors: Hans S. Cho, Palo Alto, CA (US); David A. Fattal, Palo Alto, CA (US); Theodore I. Kamins, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 239 days.

(21) Appl. No.: 12/501,844

(22) Filed: Jul. 13, 2009

(65) Prior Publication Data

US 2011/0006284 A1     Jan. 13, 2011

(51) Int. Cl.
*H01L 29/06*     (2006.01)
(52) U.S. Cl. .................................. 257/14; 257/E29.071
(58) Field of Classification Search ...................... 257/14
See application file for complete search history.

(56) References Cited

U.S. PATENT DOCUMENTS

| 7,351,601 | B2 * | 4/2008 | Scherer ............................ 438/31 |
| 7,598,513 | B2 * | 10/2009 | Kouvetakis et al. ............. 257/14 |
| 2005/0011873 | A1 * | 1/2005 | Withford et al. .......... 219/121.69 |
| 2006/0292877 | A1 * | 12/2006 | Lake ............................... 438/694 |
| 2007/0001161 | A1 * | 1/2007 | Murakowski et al. ........... 257/14 |
| 2009/0001441 | A1 * | 1/2009 | Jin et al. .......................... 257/315 |
| 2009/0057648 | A1 * | 3/2009 | Hudait et al. .................... 257/14 |

OTHER PUBLICATIONS

Scherer, A. et al.; "Photonic Crystal Nanocavities for Efficient Light Confinement and Emission;" Journal of the Korean Physical Society; Feb. 2003; pp. 768-773; vol. 42.

* cited by examiner

*Primary Examiner* — Matthew Landau
*Assistant Examiner* — Robert Bachner

(57) ABSTRACT

A photonic structure includes a plurality of annealed, substantially smooth-surfaced ellipsoids arranged in a matrix. Additionally, a method of producing a photonic structure is provided. The method includes providing a semiconductor material, providing an etch mask comprising a two-dimensional hole array, and disposing the etch mask on at least one surface of the semiconductor material. The semiconductor material is then etched through the hole array of the etch mask to produce holes in the semiconductor material and thereafter applying a passivation layer to surfaces of the holes. Additionally, the method includes repeating the etching and passivation-layer application to produce a photonic crystal structure that contains ellipsoids within the semiconductor material and annealing the photonic crystal structure to smooth the surfaces of the ellipsoids.

17 Claims, 8 Drawing Sheets

(from columns)

(from holes)

ial photonic structure illustrated in FIG. 5B, according to one embodiment of principles described herein.

PHOTONIC STRUCTURE

BACKGROUND

Photonic crystals are periodic optical nanostructures which are designed to influence photon behavior. These periodic optical nanostructures contain repeating internal regions of high and low indexes of refraction which are on the same scale as photonic wavelengths. These periodic optical nanostructures allow or disallow the transmission of certain of light waves through the photonic crystal. In some cases no lightwaves can propagate at all in a certain range of frequencies called a "bandgap".

Photonic crystals can exhibit a wide variety of behavior including inhibition of spontaneous emission, omni-directional reflectivity, and low loss waveguiding. Possible applications for photonic crystals include, but are not limited to, improved waveguides, reflecting surfaces, and optical computers. In some embodiments, it can be desirable to create three dimensional photonics crystals in a semiconductor matrix. Creating three-dimensional photonics crystals in a semiconductor matrix leverages the legacy semiconductor manufacturing knowledge and can lead to a number of benefits such as cost savings, easier integration of optical components with more conventional electronics, and more robust systems.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1A:
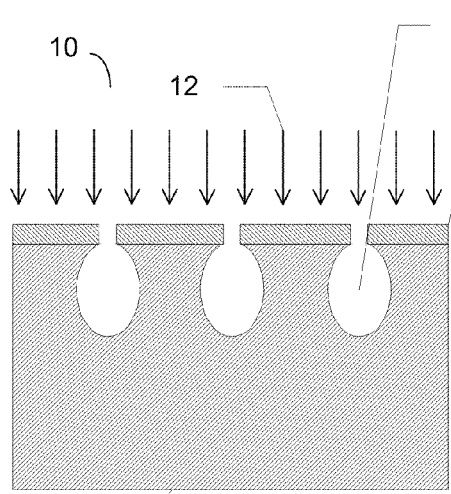
FIG. 1A is a cross-sectional diagram of the effects of an illustrative etch process performed on a masked substrate, according to one embodiment of principles described herein.

Three-Dimensional Photonic Crystals (3D PCs) comprised of periodic optical structures, with periods of tens to hundreds of nanometers, have unique optical properties not seen in their two-dimensional counterparts. The most notable property is the possibility of a complete bandgap: in some frequency range, no optical wave will propagate through the photonic crystal, regardless of the optical wave's direction. Taking advantage of this unique property, 3D PCs may be used to create perfect mirrors that reflect light from all incidence angles. Additionally, defects in the periodic structure of a 3D PC may confine light and may be used to realize high-quality factor (Q-factor) cavities and waveguides.

Some methods of creating periodic three-dimensional structures in a semiconductor matrix include fabricating two-dimensional photonic crystal layers and stacking the layers repeatedly. These methods require a precise alignment step between each of the stacked layers to maintain the periodicity in the photonic structure. However, this precise alignment is technically difficult and cost prohibitive.

Other fabrication methods include using directed, self-assembled, nanoparticles or block co-polymers to obtain three-dimensional periodic structures that may be used in photonic crystal applications. Other methods include holographic lithography to create three-dimensional structures in a polymer resist. The materials used in these methods are generally organic, are not single-crystalline, and do not possess the mechanical robustness, heat resistance, or high index of refraction inherent with many inorganic materials. For example, the elemental crystalline semiconductors such as silicon (Si) and germanium (Ge) are relatively robust, heat resistant and have high indices of refraction. Additionally, self-assembled structures typically contain significant numbers of defects within the periodic structure that can adversely alter their optical properties.

Therefore, it is desirable to have a self-aligned method for fabricating three-dimensional structures in an inorganic matrix. A proposed self-aligned fabrication method may create three-dimensional shapes in a single-pass and may further include directional dry etch or anneal processes. The self-aligned fabrication method may further include epitaxial or other deposition processes to obtain alternate three-dimensional photonic structures. The self-aligned method may create three-dimensional shapes without repeated masking, alignment, or deposition steps.

Additionally, a self-aligned fabrication process retains the design freedom offered by lithography and dry etching process and further allows for structures with increased sidewall smoothness. The method may additionally provide a rich variety of shapes depending on the extent (in time or temperature, etc.) of an additional anneal step. Finally, fabrication methods using self-aligned methods are technically easier to complete and amenable to mass-production.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

As used in the specification and appended claims, the term "periodic" or "periodic array" refers to a repeated structure with a substantially similar size and/or spacing along at least one dimension. For example, structures in a two dimensional periodic array may have a first spacing in a first direction and different spacing in another direction. In general, for a three dimensional photonic crystal, the x, y, and z periodicities can be different.

Additionally, the spacing or structures may be interrupted in one or more dimensions. For example, a periodic array in matrix may be interrupted by matrix edges or other structures within the matrix.

Figure 1B:
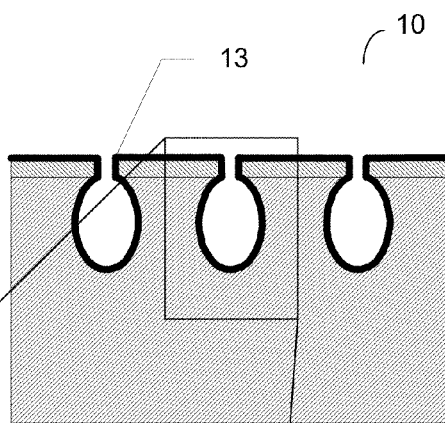
FIG. 1B is a cross-sectional diagram of the effects of an illustrative passivation process performed on an etched three-dimensional photonic structure, according to one embodiment of principles described herein.
Figure 1C:
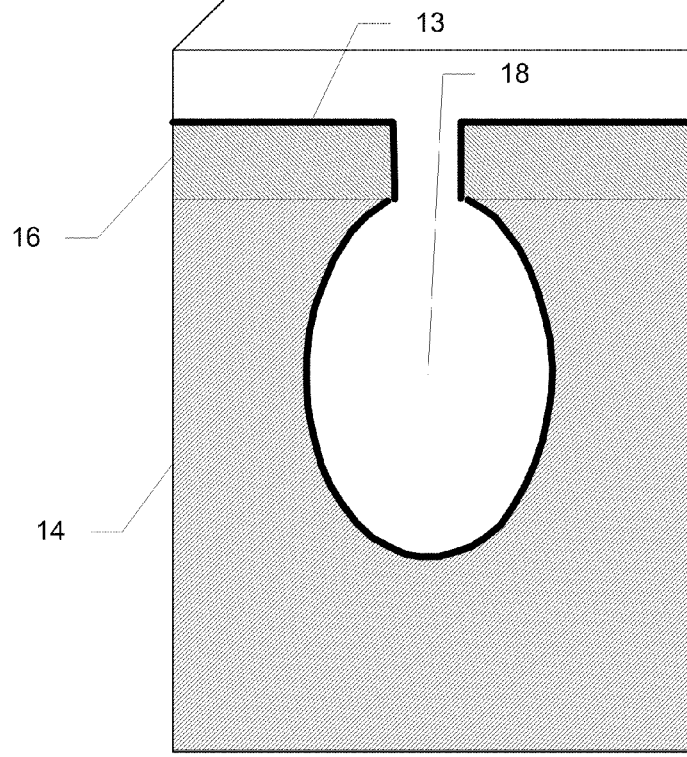
FIG. 1C is a larger cross-sectional diagram of an element of the illustrative three-dimensional photonic structure depicted in FIG. 1B, according to one embodiment of principles described herein.

According to one illustrative example, a method of Reactive Ion Etch (RIE) includes alternating etch and passivation processes to create high-aspect ratio holes in Si, Ge, or any other matrix material that can be etched with a RIE process. For example, a number of amorphous insulators, such as silicon oxide or glass, could be used as the matrix material. FIGS. 1A, 1B and 1C illustrate the effects of an RIE and passivation processes on an optical structure 10. According to one illustrative embodiment, the masked substrate consists of a bulk semiconductor substrate covered by a masking layer or film that is patterned lithographically. In one embodiment, the RIE process uses a partially anisotropic plasma etch 12 of sulfur hexafluoride ($SF_6$) to etch Si 14 in a nearly vertical direction. The etch may occur through an etch mask 16 with circular holes and form a hole 18 in the Si that is shallow, somewhat ellipsoidal, and an extension of the circular etch mask. The circular holes may be formed in a periodic array, the holes occurring or recurring at regular intervals within the periodic array. Additionally, the etching slightly expands the ellipsoidal hole circumferentially below the etch mask.

Figure 2A:
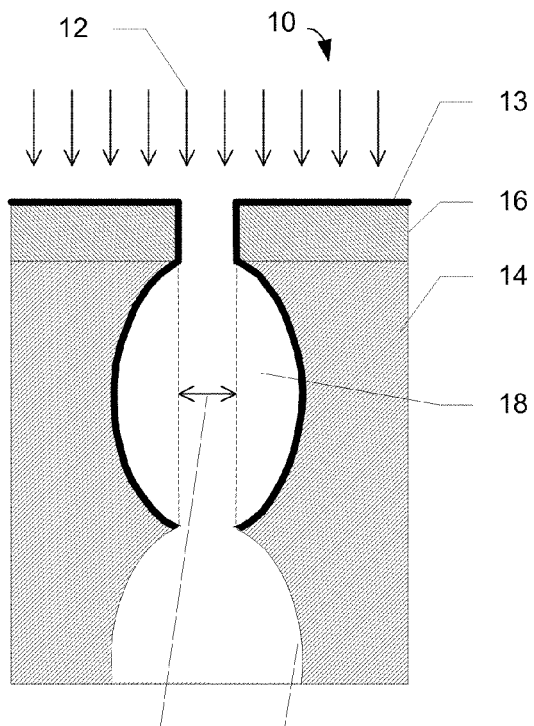
FIG. 2A is a cross-sectional diagram of the effects of an illustrative repeated etch process performed on a masked substrate, according to one embodiment of principles described herein.
Figure 2B:
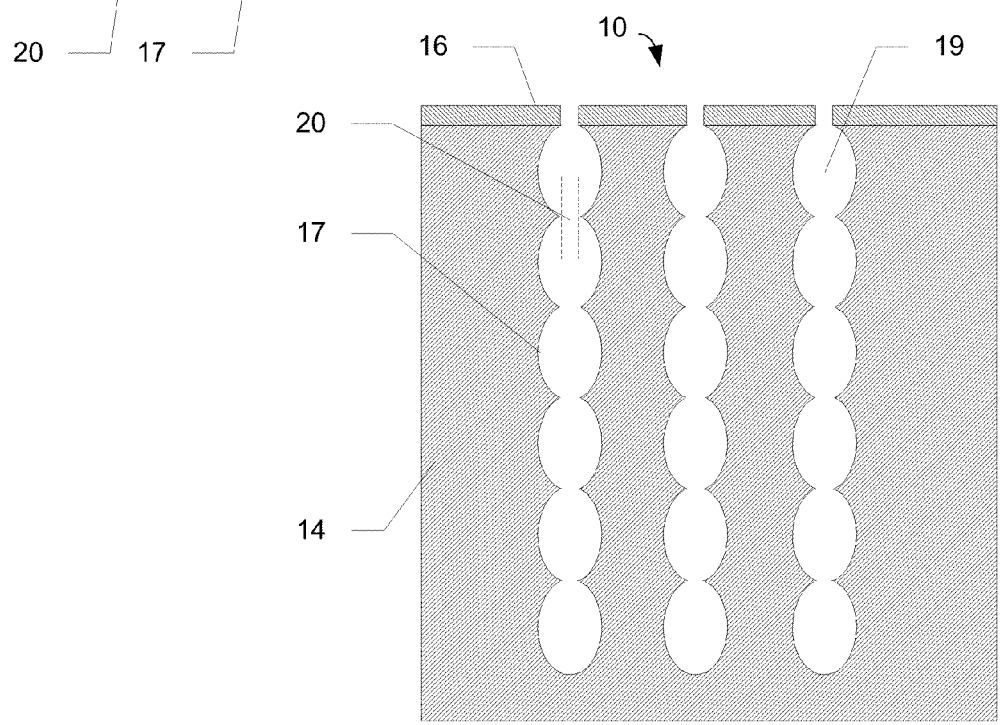
FIG. 2B is a cross-sectional diagram of the effects of an illustrative repeated etch and passivation process performed on a masked substrate, according to one embodiment of principles described herein.

The additional passivation step illustrated in FIG. 1B includes depositing a chemically inert passivation layer 13 (usually $C_4F_8$) over the etched surfaces. FIG. 1C illustrates a larger view of the passivation layer 13 covering the mask 16 and the etched surfaces of the hole 18. The passivation layer protects the interior sidewalls of the hole 18 as the etch process is repeated. However, as illustrated in FIG. 2A, the nearly vertical plasma etch 12 removes the passivation layer 13 directly below the unprotected regions of the etch mask 16, thereby exposing and further etching the Si 14. This produces a narrow channel 20 at the bottom of the hole 18. As illustrated in FIG. 2B, the passivation and etching process is repeated to produces a number of deep holes 19 with the characteristic narrow channel 20, which is approximately the width of the corresponding original hole in the etch mask 16. In addition, the hole contains several characteristic "scallops", or segments 17. The repeated etching and passivation steps produce a vertical column with a number of segments in the shape of scallops which expand slightly in the lateral direction, before narrowing at the boundary with the next segment 17. According to one illustrative embodiment, each segment 17 corresponds to a single etch/passivation cycle.

Figure 3A:
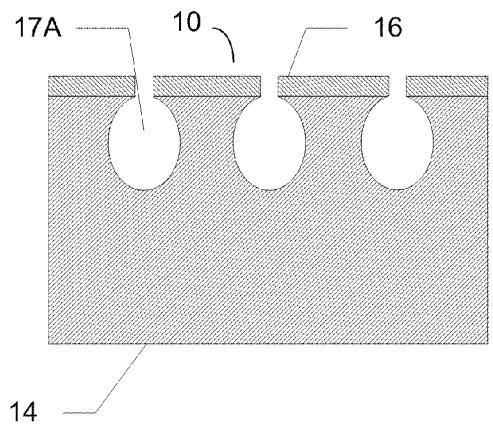
FIG. 3A is a cross-sectional diagram of the effects of an illustrative additional etch process performed on a masked substrate, according to one embodiment of principles described herein.

In an alternative embodiment, the etch process produces exaggerated scalloping. FIG. 3A illustrates the effects of an etch process that produces scallop-shaped segments 17A in an optical structure 10. The segments 17A bulge much wider than the width of the etch mask hole. Such an etch process creates a segment 17A that is nearly a spherical bubble or ellipsoid in the Si matrix 14. A substantially spherical ellipsoid refers to an ellipsoid which can be annealed to repeatably produce an array of ellipsoids which have a substantially uniform hole size and shape. According to one illustrative embodiment, the diameter of the holes can be between 40 to 60% of linear size of the unit cell. In another embodiment, the substantially spherical ellipsoid may have a substantially constant diameter as measured in any direction. As used in the specification and appended claims the term "three-dimensional periodic array" refers to the repetition at regular intervals of an optical structure within a matrix. In some illustrative embodiments, this repetition may be regularly repeated in all three dimensions. The three-dimensional periodic array may be interrupted in some circumstances. For example, the three-dimensional periodic array may stop at the edge of the matrix or may be formed in specific regions within a photonic structure. Additionally, the period may be different in different directions. For example, it may be desirable for the photonic crystal to interact with vertically incident light differently than horizontally incident light. In this case, the vertical spacing of the optical structures within the matrix may be different than the horizontal spacing of the array.

Figure 3B:
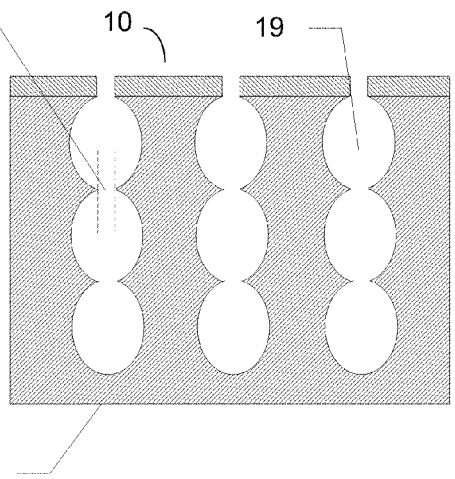
FIG. 3B is a cross-sectional diagram of the effects of an illustrative additional repeated etch and passivation process performed on a masked substrate, according to one embodiment of principles described herein.

Additionally, FIG. 3B illustrates a repeated etch process that connects each segment 17A to a neighboring segment 17A in the hole 19 by a narrow channel 20, which is still approximately the width of the corresponding original hole in the etch mask 16. The modified etch process may include a hard etch mask impervious to the $SF_6$ etch to produce bulging scallop segments 17A. Additionally, the modified etch process may increase the time of both the etch cycle, which would expand the hole laterally, and the passivation cycle, which would further shield the sidewalls from the longer-duration etch cycle. Each etch cycle would strongly penetrate only the bottom of the passivation layer deposited at the previous cycle, directly beneath the etch mask hole, and then proceed to etch the Si under the new hole to the same vertical and lateral extent as the previous cycle.

Figure 3C:
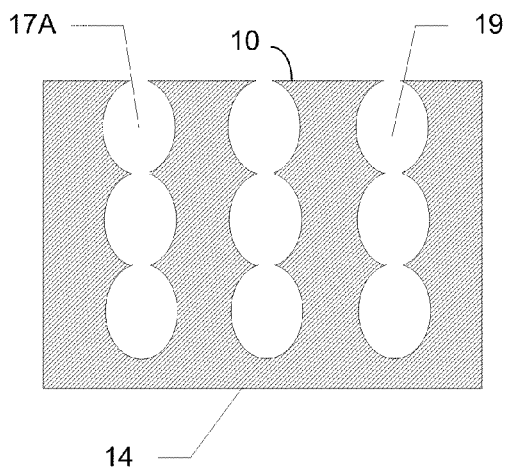
FIG. 3C is a cross-sectional diagram of the structure after removing an etch mask, according to one embodiment of principles described herein.
Figure 3D:
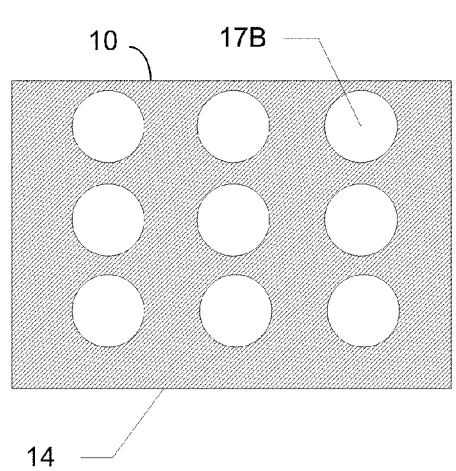
FIG. 3D is a cross-sectional diagram of the effects of performing an illustrative high-temperature anneal on the three-dimensional photonic structure illustrated in FIG. 3C, according to one embodiment of principles described herein.

The repeated etch and passivation processes may produce very rough surfaces contaminated with polymer residue, which diminish optical performance. The process for producing an optical structure may therefore include a surface preparation process to both clean and smooth the roughened surfaces. One method of removing Si surface roughness is to thermally oxidize the surface by heating the optical structure in an oxygen-rich ambient environment, and afterwards stripping the oxide layer chemically. In addition to the cleaning processes, the etch mask may also be removed before additional processing steps. The etch mask may be chemically or mechanically removed. FIG. 3C illustrates the optical structure from FIGS. 3A and 3B, with the etch mask removed.

After cleaning the surface, the etched structure may be subjected to a high temperature anneal in a reducing ambient. The temperature may be between 600-900 deg C. for Ge, or similarly, 900-1200 deg C. for Si. If other materials are used, the temperature must be sufficiently high to achieve substantial surface diffusion during the time of the anneal, but not so high as to melt or otherwise negatively deform the structure. Additionally, the reducing ambient may include a hydrogen-rich environment, a very pure inert ambient, or an ultra-high-vacuum ambient. Such annealing causes thermally activated surface diffusion of the semiconductor material along the hole walls. The surface diffusion produces smoother surfaces and redistributes the material to cause macroscopic changes in the shape of the segments 17A. Therefore, as defined herein, a smooth surface is one that has undergone sufficient annealing to remove a majority of light-scattering optical defects in the segments. The surface diffusion may further modify the topological state of the multi-segmented structure as semiconductor atoms redistribute to reduce local stress concentrations or surface energy. In the case of a severely scalloped hole, with neighboring sections 17A separated by narrow constrictions or a narrow channel 20, the annealing may result in narrowing of the constrictions. In extreme cases, the annealing may close the constrictions or channels 20 to create neighboring but separate, substantially spherical ellipsoids 17B. The extent of the annealing step depends on the desired final configuration for the three-dimensional photonic crystal.

Repeating the etching and passivation processes, and then applying the cleaning and annealing processes described above produces a three-dimensional periodic structure interspersed with nearly spherical voids or ellipsoids 17B in an optical structure 10. The different refractive indices of the solid material 14 and the substantially spherical sections or ellipsoids 17B (or the ambient material filling the empty space) produce the photonic crystal's optical properties. Additionally, improved optical properties may be obtained through more spherical ellipsoids that have smooth surfaces and are separately distinct entities, i.e. physically separated by the matrix material.

Figure 4A:
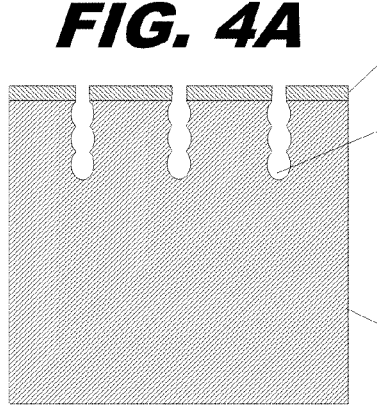
FIG. 4A is a cross-sectional diagram of the effects of an illustrative additional repeated etch and passivation process performed on a masked substrate, according to one embodiment of principles described herein.
Figure 4B:
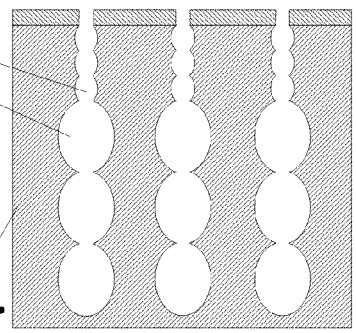
FIG. 4B is a cross-sectional diagram of the effects of an illustrative additional repeated etch and passivation process performed on a masked substrate, according to one embodiment of principles described herein.
Figure 4C:
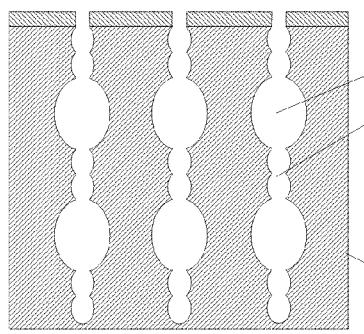
FIG. 4C is a cross-sectional diagram of the effects of an illustrative additional repeated etch and passivation process performed on a masked substrate, according to one embodiment of principles described herein.
Figure 4D:
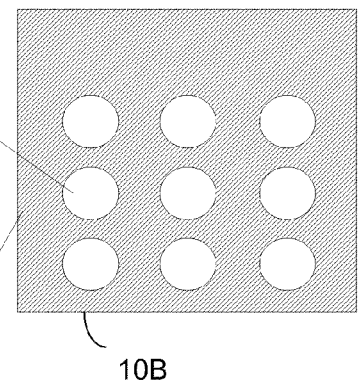
FIG. 4D is a cross-sectional diagram of the effects of performing an illustrative high-temperature anneal on the three-dimensional photonic structure shown in FIG. 4B, according to one embodiment of principles described herein.
Figure 4E:
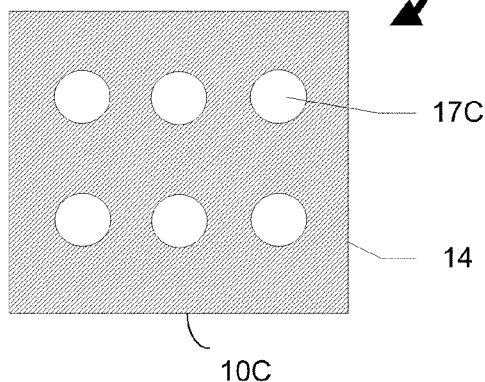
FIG. 4E is a cross-sectional diagram of the effects of performing an illustrative high-temperature anneal on the three-dimensional photonic structure shown in FIG. 4C, according to one embodiment of principles described herein.

In a further embodiment of the processes described above, the etch parameters of different segments may be varied to create desired variations between the different segments, which would allow the optical properties to be further controlled. FIGS. 4A through 4E illustrate non-limiting variations on the processes described above. In FIG. 4A, the etch and passivation processes operate at shorter durations to produce a high-aspect ratio hole 19 deep into the silicon structure 14. FIGS. 4B and 4C illustrate variations on the etch and passivation processes that may be performed after forming the three-dimensional structure in FIG. 4A. In 4B, the longer-duration etch and passivation processes repeat to produce the scallop-shaped segments 17A, similar to those illustrated in FIG. 3A. In FIG. 4C, a longer duration etch and passivation process is followed by repeated, shorter-duration etch and passivation processes to produce scallop-shaped segments 17A separated by narrow channels 20. FIGS. 4D and 4E illustrate the effects of an annealing process performed on the structures illustrated in 4B and 4C, respectively. FIG. 4D illustrates an optical structure 10B comprising closely spaced spherical voids or ellipsoids 17B. Similarly, FIG. 4E illustrates an optical structure 10C comprising more distantly spaced, substantially spherical sections or ellipsoids 17C.

Figure 4F:
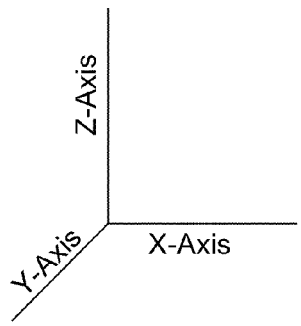
FIG. 4F is an illustrative three-axis coordinate diagram used to describe illustrative three-dimensional photonic structures, according to one embodiment of principles described herein.

Similar to the processes described above, various process parameters may be varied to produce different optical properties in an optical structure. For example, returning to FIGS. 4A, 4D, and 4E, and referring to the three-dimensional axis illustrated in FIG. 4F, the mask 16 hole size and spacing (in the X-Y plane) may be varied to control the size, shape and distribution of the spherical voids 17C in the X-Y plane. Likewise, the etch and passivation processes may be varied to control the size, shape, and distribution of the spherical voids 17C in the Z-axis. Therefore, the final three-dimensional optical structure, 10B or 10C, may include spherical or ellipsoidal voids 17C of different sizes, shapes, and distributions, to achieve desired optical properties. For example, the spherical voids 17C may be sized and distributed as a function of the band gap for a target range of photonic radiation frequencies. According to one illustrative embodiment, the ellipsoidal structures may have only local periodicities. Over larger distances the periodicity may be varied to accomplish the desired optical performance. For example, the optical bandgap of the photonic crystal may be varied by changing the periodicity of the nanostructures. Additionally or alternatively, the ellipsoidal structures may be arranged in various non-periodic arrangements.

Further changes and additions to the processes described above may be made to achieve additional, alternative, optical properties. For example, to obtain a different refractive index contrast between semiconductor matrix and the etched space, an anneal may be performed to obtain nearly spherical, but still connected, holes. The holes may then be filled with a filler material of a desired refractive index. The refractive index of the filler material may be different from the refractive index of the matrix material. For example, if the matrix is made from silicon, the etched space may be filled with germanium.

Figure 5A:
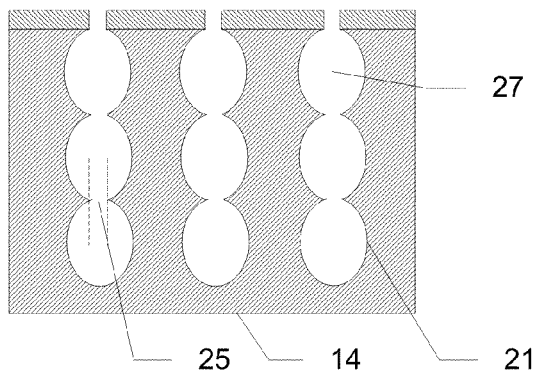
FIG. 5A is a cross-sectional diagram of the effects of an illustrative additional repeated etch and passivation process performed on a masked substrate, according to one embodiment of principles described herein.
Figure 5B:
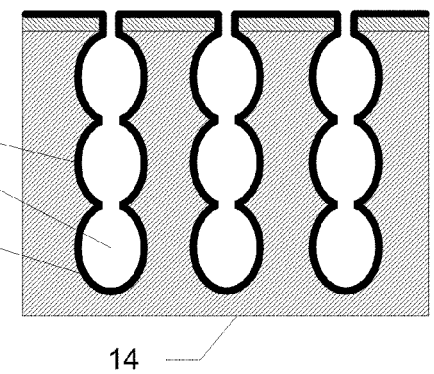
FIG. 5B is a cross-sectional diagram of the effects of an illustrative additional passivation process performed on the three-dimensional photonic structure illustrated in FIG. 5A, according to one embodiment of principles described herein.
Figure 5C:
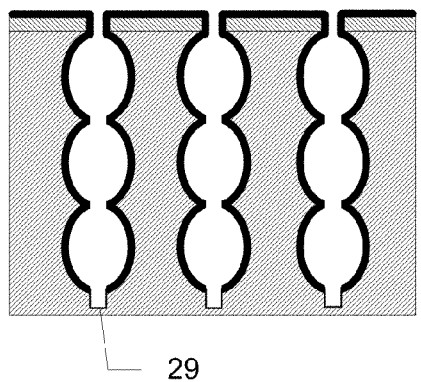
FIG. 5C is a cross-sectional diagram of the effects of an illustrative anisotropic etch process performed on the three-dimensional photonic structure illustrated in FIG. 5B, according to one embodiment of principles described herein.

FIGS. 5A-5D further illustrate the non-limiting, three-dimensional optical structures produced by the process described above. Repeated etching and passivation processes, followed by an anneal step, produce a segmented ellipsoid structure 27, illustrated in FIG. 5A, with clean, smooth surfaces 21. Additionally, the segments are still connected through narrow channels 25 in the silicon matrix 14. FIG. 5B illustrates the effects of a passivation process. In this example, a thermal oxidation process forms a thin layer of silicon oxide ($SiO_2$) 23 on the interior walls of the segmented ellipsoid structure 27. Other passivation techniques which may be used include chemical vapor deposition, atomic layer deposition, and other suitable techniques. This "selective coating" aids selective deposition steps illustrated in FIGS. 5C and 5D. In FIG. 5C, an anisotropic etch removes the selective coating 23 from the bottoms of the holes 29 to expose the matrix material 14 (silicon, in this example). In an alternative embodiment, the etch forms an aperture which passes entirely through the matrix material to expose a different substrate which underlies the matrix material.

Figure 5D:
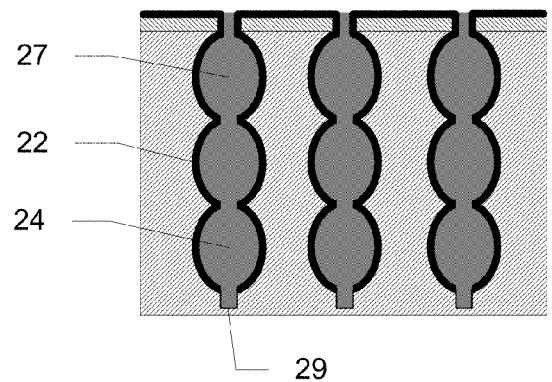
FIG. 5D is a cross-sectional diagram of an illustrative three-dimensional photonic structure comprising two different dielectric materials, according to one embodiment of principles described herein.

In FIG. 5D, the filling material 24 (germanium, in this example) is then selectively grown after it nucleates on the exposed matrix material 14 at the bottoms of the holes 29. The filling material 24 does not grow on the passivated surfaces 23 still covered by the selective coating ($SiO_2$). The filling material can be deposited so that it fills the holes from the bottom to the top, conforming to the varying cross section of segmented hole structure 27. The filling process may be epitaxial such that the material filling the segmented hole structure 27 is a single crystal. Additionally, the crystal structure of the filling material may be crystallographically aligned with the substrate crystal structure. Alternatively, the filling material 24 in the segmented hole structure 27 may have a polycrystalline or an amorphous structure. Alternatively, the holes may be filled by omitting the selective coating process illustrated in FIG. 5B and conformally depositing the filler material on all surfaces (not shown). However, conformal deposition is likely to leave unfilled voids in the structure (not shown). The voids may affect, either positively or negatively, the optical properties of the three-dimensional optical structure.

Figure 6A:
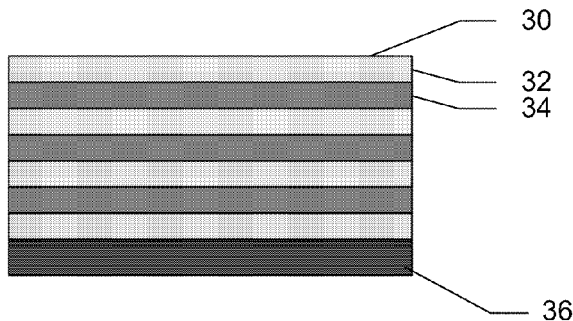
FIG. 6A is a cross-sectional diagram of a three-dimensional precursor to the final photonic structure comprising multiple, alternating layers of two different dielectric materials, according to one embodiment of principles described herein.

FIGS. 6A through 6G illustrate a further process embodiment and resulting three-dimensional optical structure. FIG. 6A illustrates a film stack 30 of multiple, alternating layers of two different dielectric materials, 32 and 34, disposed on a substrate 36. The two different dielectric materials may have different etching properties. The substrate may be a Si wafer and the dielectric materials may include silicon dioxide ($SiO_2$) and silicon nitride ($Si_3O_4$). By way of example and not limitation, other dielectric materials may include aluminum oxide and aluminum nitride.

Figure 6B:
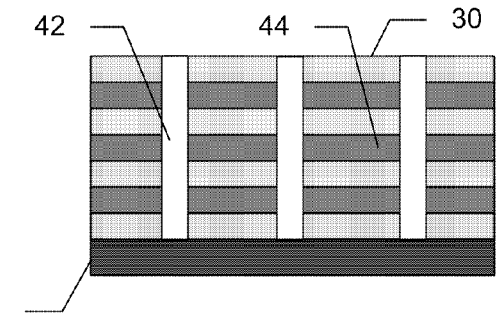
FIG. 6B is a cross-sectional diagram of an illustrative etched three-dimensional precursor to the final photonic structure shown in FIG. 6A comprising an array of holes or columns, according to one embodiment of principles described herein.
Figure 6C:
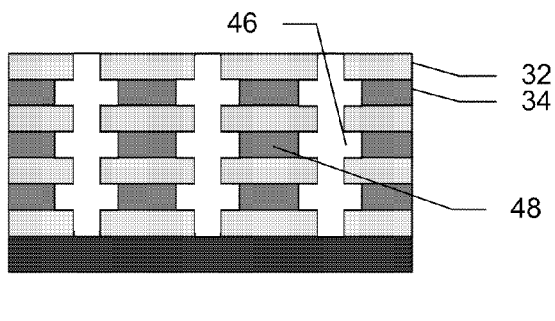
FIG. 6C is a cross-sectional diagram of an illustrative selectively etched three-dimensional precursor to the final photonic structure illustrated in FIG. 6B, according to one embodiment of principles described herein.
Figure 6D:
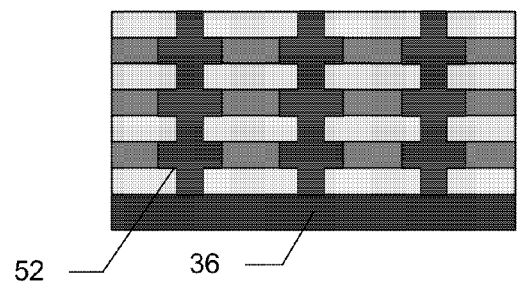
FIG. 6D is a cross-sectional diagram of the three-dimensional precursor to the final photonic structure shown in FIG. 6C, filled by selective deposition of a second material, according to one embodiment of principles described herein.

In FIG. 6B, an array of holes 42, or a pattern leaving an array of columns 44, may be etched vertically through the film stack 30, exposing the substrate 36. The etching may be done through the RIE process described above. Additionally, as illustrated in FIG. 6C, one of the dielectric materials may be selectively etched in the lateral direction to a controlled extent to create empty spaces or holes 46. The lateral etching may be done using timed, wet, chemical etching. For example, phosphoric acid ($H_3PO_4$) may be used to etch $Si_3N_4$ at a much faster rate relative to $SiO_2$. As another example, a solution containing hydrofluoric acid (HF) may be used to etch $SiO_2$ at a much faster rate than it etches $Si_3N_4$. Further, as illustrated in FIG. 6D, the empty spaces or holes 46 in the remaining structure may be filled by selective epitaxy or selective deposition with a semiconductor material (Si, Ge, etc.) 52, seeded by the substrate 36. According to one embodiment, the semiconductor material could be a non-single crystal material. This non-single crystal material may be deposited using a variety of techniques. Additionally, the filling material may be formed from metal, which is suitable for electrochemical deposition techniques such as electroplating or electroless deposition. The filling material may be another material that can be electrochemically deposited. The filling material may also be an insulating material.

Figure 6E:
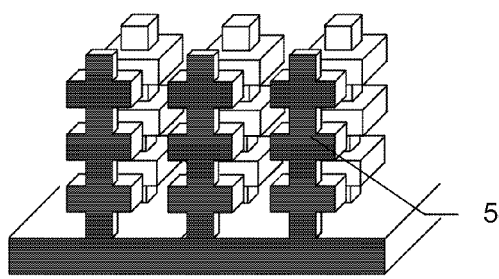
FIG. 6E is a cutaway perspective view of the three-dimensional array of columns, according to one embodiment of principles described herein.

Additionally, as illustrated in FIG. 6E, the alternating dielectric materials, 32 and 34 which form the template, may be removed to form a semiconductor structure 54 which comprises a number of columns. The alternating dielectric materials may be removed by a number of methods including wet or plasma etching. For silicon oxide and silicon nitride, the etch process may be a wet chemical etch using hydrofluoric acid (HF), leaving a three-dimensional periodic semiconductor structure 54 that is a negative of the dielectric mold.

Figure 6F:
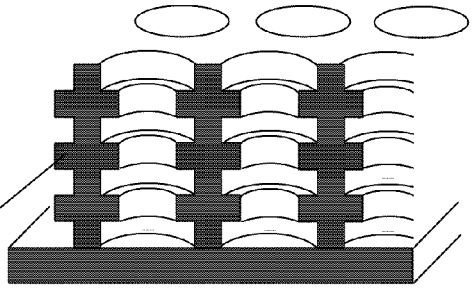
FIG. 6F is a cutaway perspective view of the three-dimensional array of holes, according to one embodiment of principles described herein.

FIG. 6F illustrates an alternative embodiment, in which the removal of the dielectric mold creates a semiconductor structure 54 which has a number of holes with diameters that vary along the vertical axis of the hole.

Figure 6G:
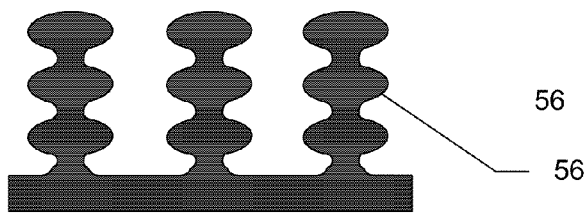
FIG. 6G is a cross-sectional diagram of the effects of performing an illustrative high-temperature anneal on the three-dimensional array of columns illustrated in FIG. 6E, according to one embodiment of principles described herein.
Figure 6H:
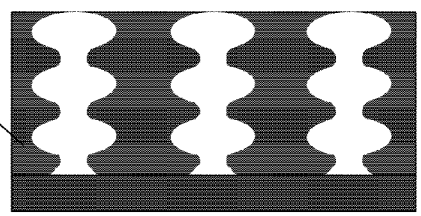
FIG. 6H is a cross-sectional diagram of the effects of performing an illustrative high-temperature anneal on the three-dimensional array of holes illustrated in FIG. 6F, according to one embodiment of principles described herein.

FIGS. 6G and 6H, illustrate the effects of a high temperature anneal, similar to those described above, which is applied to the semiconductor structures 54. As discussed above the high temperature anneal may be applied to smooth the surfaces and cause the structures to assume a surface-energy reducing configuration 56. FIG. 6G corresponds to a finished geometry which results from a high temperature anneal of the array of columns shown in FIG. 6E. FIG. 6F shows an illustrative cross-sectional view of a photonic crystal which is formed from annealing columns of laterally etched thin-sheet stacks. The result is an ordered array of solid ellipsoids arranged in columns to form a photonic crystal.

FIG. 6H shows an illustrative cross-sectional view of a photonic crystal which is formed by annealing a three dimensional photonic structure 54 which has an array of holes as illustrated in FIG. 6F. In this case, the ellipsoids are hollow. Annealing of either of these structures produces a three-dimensional photonic structure which includes a plurality of annealed, substantially smooth-surfaced ellipsoids, arranged in a three-dimensional periodic array. In these illustrative embodiments, the ellipsoids are joined in a vertical column which extends through the thickness of the photonic crystal.

The embodiments shown in FIGS. 6A-6H are only illustrative examples of photonics structures which could be fabricated using the principles described. The final structure may be manipulated by initial patterning conditions to produce a structure optimal for variety of three-dimensional photonic crystal applications.

Figure 7:
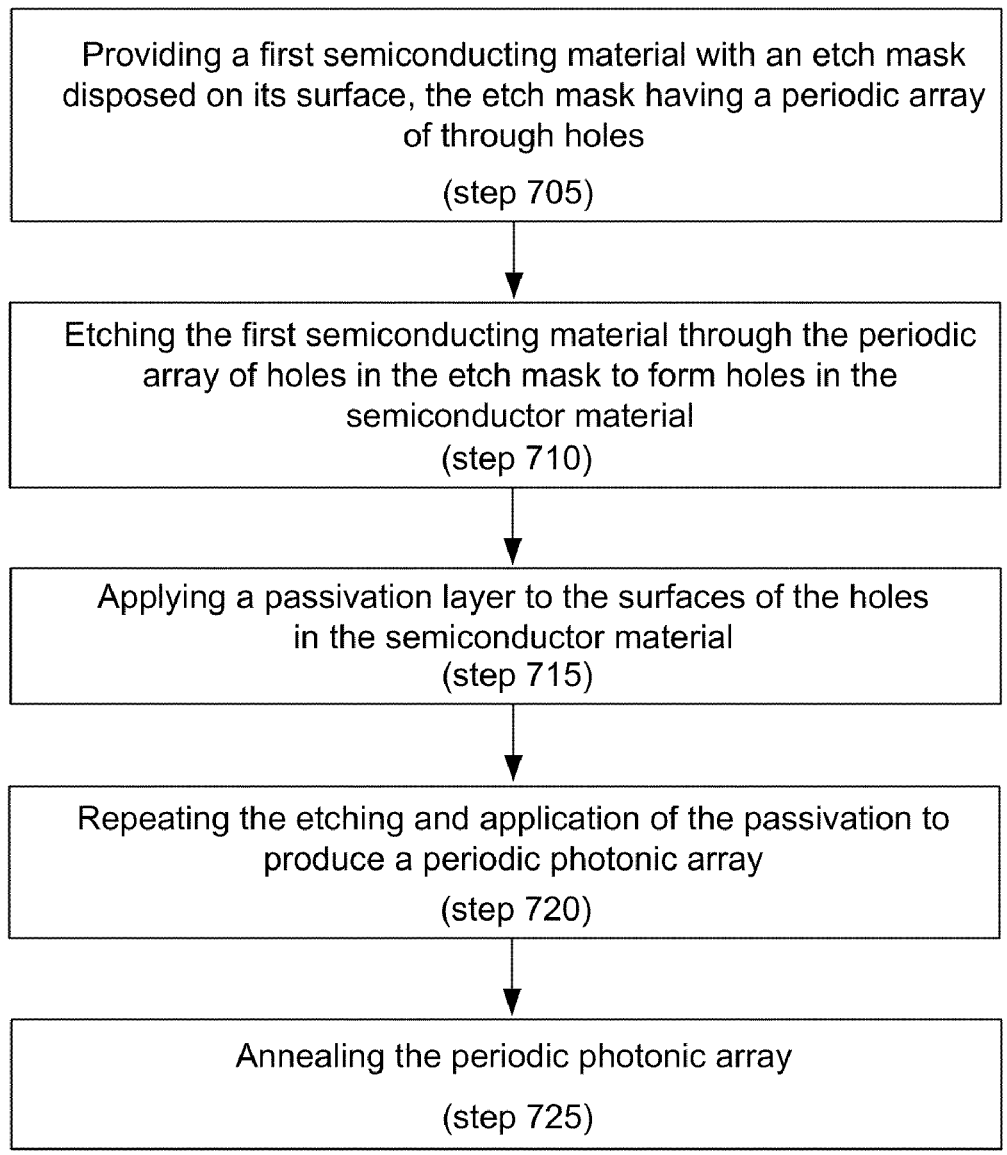
FIG. 7 is a flowchart showing one illustrative method for creating a three dimensional photonic structure in a semiconductor material, according to one embodiment of principles described herein.

FIG. 7 is a flowchart showing one illustrative method for creating a three dimensional photonic structure in a semiconductor material. An etch mask with a periodic array of holes is disposed on a surface of a first semiconducting material (step 705). The periodic array of holes is sized and spaced to achieve a band gap for a desired range of photonic radiation frequencies. The semiconductor material is etched through the periodic array of holes in the etch mask (step 710). A passivation layer is applied to the surfaces of the holes (step 715). Repeated etching and application of the passivation layer produce a photonic crystal structure which includes ellipsoids arranged in a three-dimensional periodic array (step 720). The photonic crystal structure is annealed to smooth surfaces of the ellipsoids (step 725) and possibly modify their shape. According to one illustrative embodiment, the annealing of the photonic crystal structure physically separates the ellipsoids within the semiconductor material.

According to one illustrative embodiment, the surfaces of the ellipsoids may be coated with a layer that is configured to inhibit nucleation of a second semiconductor material. The bottom of the photonic structure is directionally etched to remove the layer which inhibits nucleation. This exposes a portion of the first semiconductor which acts as a seed surface. The second semiconductor material is then grown from the seed surface upward to fill the photonic structure. The first and second semiconductor materials have different indexes of refraction.

Figure 8:
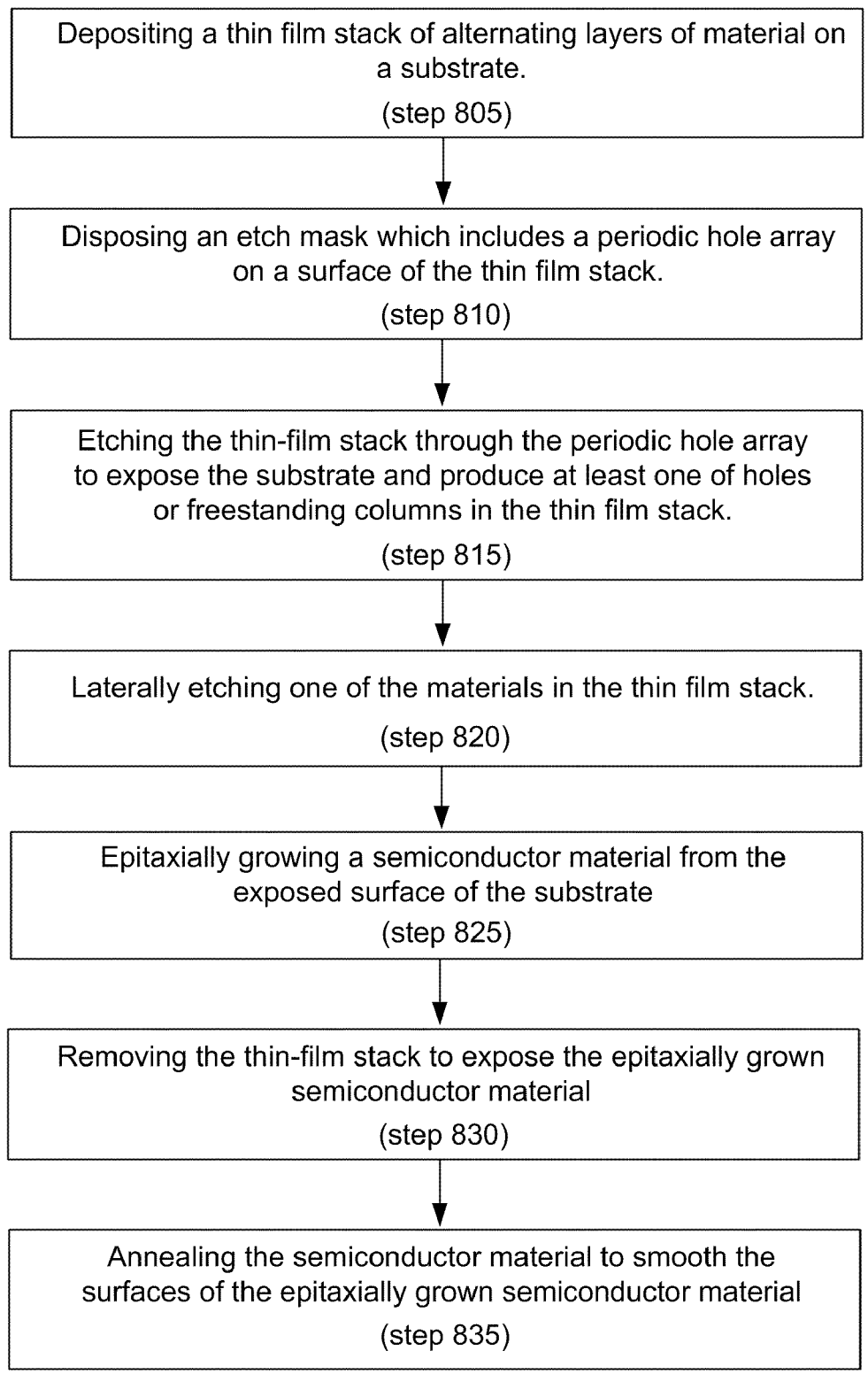
FIG. 8 is a flowchart showing an illustrative alternate method for creating a three dimensional photonic structure in a semiconductor material, according to one embodiment of principles described herein.

FIG. 8 is a flowchart showing an alternative method for creating a three dimensional photonic structure in a semiconductor material. According to one illustrative embodiment, a layered stack of thin film alternating layers may be constructed, etched and annealed to form a photonic crystal array. According to one illustrative embodiment, a stack of alternating layers of thin film materials having substantially different etching characteristics is deposited on a substrate (step 805). For example, alternating layers of silicon oxide and silicon nitride can be deposited on the substrate.

An etch mask which includes a two-dimensional periodic hole array is disposed on the top surface of the thin-film stack (step 810). The thin film stack is then etched through the periodic hole array of the etch mask to expose the substrate and produce holes or columns in the thin film stack (step 815). A variety of alternative etching processes could be used to produce the holes or columns. After forming holes or columns in the thin film stack, a lateral etch is performed to selectively etch one of the materials which makes up the thin film stack (step 820).

According to one illustrative embodiment, the holes may be filled with a second material. For example, a semiconductor material may be epitaxially grown from the exposed surface of the substrate (step 825). The thin-film stack is then removed to expose the epitaxially grown semiconductor material (step 830). The semiconductor material is annealed to smooth its surfaces (step 835) and possibly modify the shape of the holes.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A photonic structure comprising:
a matrix material; and
a plurality of ellipsoids arranged within the matrix material, in which the each of the ellipsoids is defined by a surface that is annealed such that surface diffusion redistributes material on the surface to redefine a shape of the ellipsoid and remove light scattering optical defects from the surface;
in which the ellipsoids and the matrix material comprise different semiconductor materials.

2. The photonic structure of claim 1, in which the ellipsoids are substantially spherical.

3. The photonic structure of claim 1, in which the ellipsoids and the matrix material comprise different refractive indices.

4. The photonic structure of claim 1, in which at least two vertically adjacent ellipsoids are physically separated by the matrix material.

5. The photonic structure of claim 1, in which the ellipsoids comprise an oxide coating on the surface.

6. The photonic structure of claim 1, in which the ellipsoids are sized and spaced to achieve a band gap for a desired range of photonic radiation frequencies.

7. The photonic structure of claim 1, in which the matrix material comprises silicon and the ellipsoids comprise germanium.

8. The photonic structure of claim 1, in which the ellipsoids are connected by a channel having a smaller diameter than the ellipsoids.

9. The photonic structure of claim 1, in which the ellipsoids are arranged in a periodic array which has different periodicities in at least one of the x, y, and z directions.

10. The photonic structure of claim 1, in which the ellipsoids are physically separated by intervening matrix material and the surface comprises a closed surface.

11. The photonic structure of claim 1, in which the surface comprises an interface between the matrix material and a filling material.

12. The photonic structure of claim 11, in which the filling material is a crystal structure that is crystallographically aligned with a crystal structure of the matrix material.

13. The photonic structure of claim 11, in which the filling material in each ellipsoid is a single crystal.

14. The photonic structure of claim 13, in which the surface comprises a passivation layer covering annealed matrix material, one portion of the annealed matrix material being exposed by removal of the passivation layer, in which the exposed portion of the annealed matrix material serves as a nucleation site for the single crystal.

15. The photonic structure of claim 1, in which the ellipsoids are connected in one dimension to form a scalloped vertical columns, the columns being isolated from each other by intervening matrix material.

16. The photonic structure of claim 1, further comprising a semiconductor substrate, in which ellipsoids comprising semiconducting material grown from exposed portions of the semiconductor substrate, the ellipsoids being vertically joined on the semiconductor substrate to form an ordered array of solid ellipsoids arranged in columns.

17. A photonic structure comprising:
a semiconductor matrix material;
a plurality of substantially spherical closed ellipsoids periodically arranged within the matrix material in two or more dimensions and physically separated by the matrix material; the ellipsoids comprising:
a volume filled with a second semiconductor material having a different index of refraction than the semiconductor matrix;
an annealed surface surrounding the volume, the annealed surface comprising redistributed material that smoothes the annealed surface, changes a geometric shape of the annealed surface to reduce the surface energy of the annealed surface and removes light scattering optical defects from the annealed surface; and
a coating of oxide material disposed over the annealed surface.

* * * * *